US005867241A

United States Patent [19]

Sampica et al.

[11] Patent Number: 5,867,241

[45] Date of Patent: Feb. 2, 1999

[54] LIQUID CRYSTAL DISPLAY LAMINATION WITH SILICONE GEL ADHESIVE

[75] Inventors: James D. Sampica, Cedar Rapids; Melvin L. Campbell, Marion; C. John Anderson, Cedar Rapids; Duane Schlatter, Springville, all of Iowa

[73] Assignee: Rockwell International, Costa Mesa, Calif.

[21] Appl. No.: 431,211

[22] Filed: Apr. 28, 1995

[51] Int. Cl.[6] .................................................. G02F 1/1333

[52] U.S. Cl. ............................ 349/122; 349/158; 349/60

[58] Field of Search ................................ 359/53, 74, 79, 359/62, 63, 82, 83; 156/277, 305, 306.3, 326, 99, 107, 145, 272, 290, 291, 299, 308.4; 428/1; 349/158, 58, 60, 122

[56] References Cited

U.S. PATENT DOCUMENTS 4,043,638 8/1977 Kaufmann ................................ 359/82
4,715,686 12/1987 Iwashita et al. .......................... 359/74
5,150,231 9/1992 Iwamoto et al. .......................... 359/44
5,217,811 6/1993 Filas et al. ............................. 428/447
5,243,453 9/1993 Kawaguchi et al. ...................... 359/74
5,275,680 1/1994 Sirkin et al. ............................ 359/53

*Primary Examiner*—William L. Sikes
*Assistant Examiner*—James A. Dudek
*Attorney, Agent, or Firm*—Kyle Eppele; James P. O'Shaughnessy

[57] ABSTRACT

A liquid crystal display optical component stack-up is created with reduced defects typically caused by adhesive materials used to attach optical components to the liquid crystal display. A layer of silicone gel is positioned between a surface of the liquid crystal display and a surface of a first optical component. The layer of silicone gel attaches the first optical component to the liquid crystal display such that strain on the liquid crystal display is minimized.

4 Claims, 3 Drawing Sheets

LIQUID CRYSTAL DISPLAY LAMINATION WITH SILICONE GEL ADHESIVE

BACKGROUND OF THE INVENTION

The present invention relates generally to liquid crystal displays, and more particularly, to a method of and an adhesive for attaching optical components and optical component assemblies to a liquid crystal display.

Liquid crystal displays (LCDs) include a liquid crystal material sandwiched between two sheets of glass. The two sheets of glass are typically a substrate and a filter. Frequently, it is desirable to alter or enhance the performance of the LCD by attaching additional optical components to one or both of the LCD's two sheets of glass. These additional optical components can be items such as glass plates, diffusers, rigid compensators, heaters, and flexible films such as polarizers, retarders and dry film adhesives. Also, two or more of these optical components can be pre-assembled into an optical component assembly which is subsequently attached to the LCD. This pre-assembly approach is detailed in co-pending and commonly assigned U.S. patent application File No. 94CR088 filed on even date herewith and which is herein incorporated by reference.

Attaching additional optical components or optical component assemblies to an LCD presents a number of significant problems. First, the choice of adhesive used is critical to the display's performance. For instance, the index of refraction of the adhesive should closely match that of the optical components. Also, the adhesive should be as transparent as possible. These limitations and others render many adhesives undesirable choices.

A second problem is related to the sensitivity of LCDs to strain. Strain on an LCD can cause performance defects such as Newton rings. High durometer (hard) adhesives, such as epoxy, used to attach optical components to an LCD typically cause strain on the LCD, and thus cause strain related defects as well. A related problem is due to the expensive nature and repairability of large LCDs. Once laminated (i.e., once the optical components or assemblies have been attached to the LCD), the LCD is generally not considered repairable. This is largely due to the strength of the bond between the LCD glass and the glass of the optical component resulting from the adhesive. Because of the adhesives used in the prior art, disassembly is generally not possible without damaging the display.

Some manufacturers of LCDs have, as a result of the problems associated with the use of available adhesives and known assembly methods, turned away from the adhesive approach to attaching optical components to the LCD. Instead, they mechanically attach the component to the LCD such that an air gap is formed between the two, thereby reducing strain and possibly improving repairability. However, this method is undesirable because it adversely effects the reflectance and contrast of the display. Consequently, there is a need for an assembly process and adhesive which eliminate the problems identified above and provides high yields and repairable LCD stack-ups.

SUMMARY OF THE INVENTION

It is an object of the present invention to provide an LCD optical component stack-up which minimizes strain on the LCD caused by the adhesive which attaches the optical components or assemblies to the display. It is a second object of the present invention to provide an improved method and adhesive for attaching optical components and assemblies to an LCD. It is a third object of the present invention to provide an adhesive which allows the optical components or assemblies to be removed from the stack-up without damaging the liquid crystal display. The present invention achieves these objects and others discussed throughout this application.

A liquid crystal display optical component stack-up is created with reduced defects typically caused by adhesive materials used to attach optical components to the liquid crystal display. A layer of silicone gel is positioned between a surface of the liquid crystal display and a surface of a first optical component. The layer of silicone gel attaches the first optical component to the liquid crystal display such that strain on the liquid crystal display is minimized.

BRIEF DESCRIPTION OF THE DRAWINGS

The invention may be more fully understood by reading the following description of preferred embodiments of the invention in conjunction with the appended drawings wherein.

DETAILED DESCRIPTION OF THE PREFERRED EMBODIMENTS

The present invention is an improved method of attaching optical components or optical component assemblies to the glass of an LCD. The method makes novel use of a silicone gel as the adhesive which bonds the optical components or assemblies to the glass of the LCD. The silicone gel is mixed to obtain a very low durometer (soft) adhesive in order to minimize strain on the LCD and so that the LCD can be repaired even after the optical components or assemblies have been attached.

Figure 1:
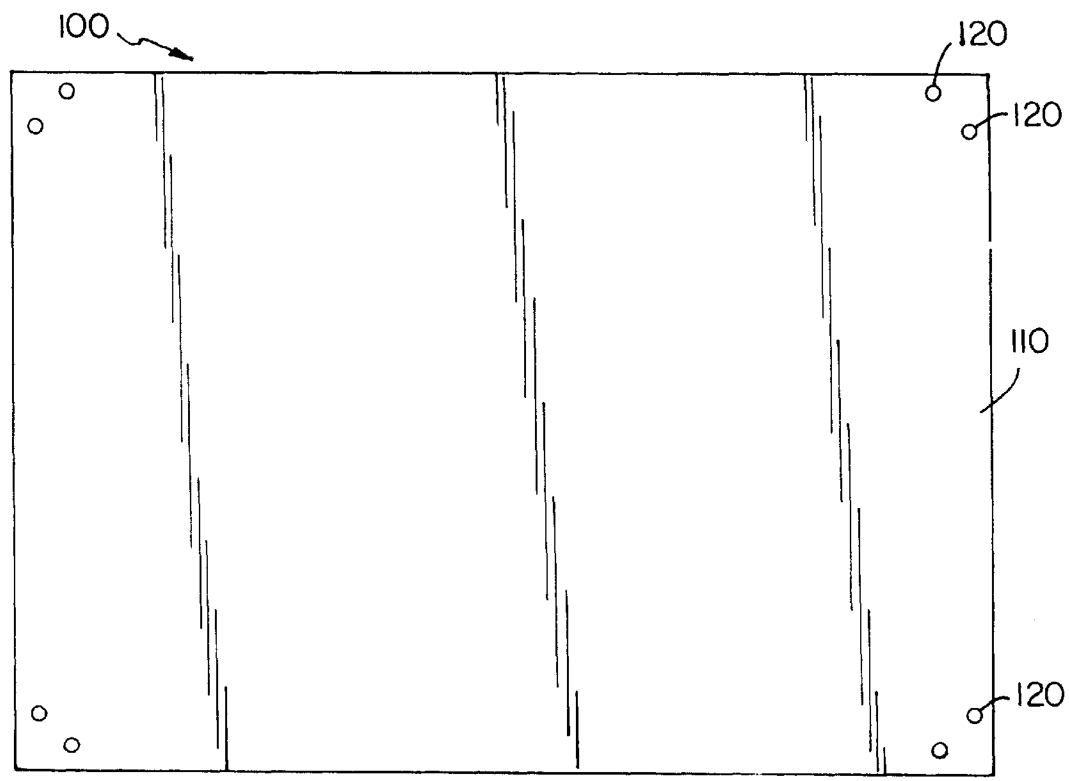
FIG. 1 is a top view of an alignment and assembly apparatus used in accordance with preferred embodiments of the present invention to create LCD stack-ups.
Figure 2:
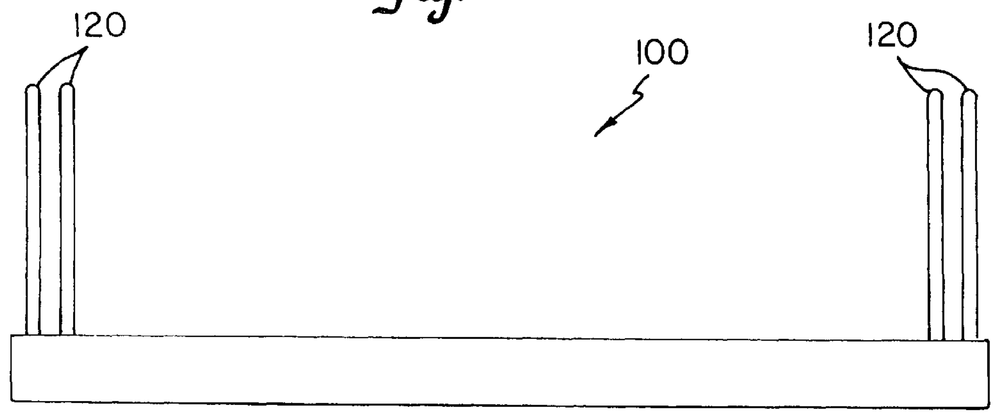
FIG. 2 is a side view of the alignment and assembly apparatus shown in FIG. 1.

FIGS. 1 and 2 are top and side views respectively of an assembly fixture used in accordance with preferred methods of the present invention to produce LCD stack-ups by attaching optical components or assemblies to an LCD. Fixture 100 includes flat plate 110 and pins 120. Pins 120 are pressed into flat plate 110 in a predetermined configuration to produce a pin field which corresponds to the dimensions of the LCD and of the optical component assemblies which are to be attached to the LCD.

The embodiment of fixture 100 illustrated in FIGS. 1 and 2 corresponds to situations in which the LCD and the optical component assemblies to be attached to the LCD all have at least some dimensions in common. Pins 120 are arranged such that, when the LCD and optical component assemblies are lowered down into the pin field, each of four corners of the LCD and of the assemblies will be held in place between one of the four pairs of adjacent pins. Alternatively, six pins arranged in three pairs to hold three corners of the LCD and assemblies will work as well. Still other configurations are possible.

Fixture 100 is the preferred embodiment of an alignment and assembly device for producing LCD stack-ups because the pin field can be used to maintain tight control of alignment tolerances. However, other suitable alignment devices can be used to hold the LCD and optical components during assembly. For instance, a plate having a cavity in which the LCD and assemblies are inserted can be used.

In situations in which different sized components are being assembled to create the LCD stack-up, additional pins of various lengths can be employed to achieve the alignment. For instance, if the first optical component assembly to be placed into the pin field was the smallest, pins which extend up from flat plate 110 no higher than the first assembly can be used. Then, when the larger LCD and second optical component assembly are later inserted into the pin field, they will miss the top of the short pins and be aligned by other taller pins located on flat plate 110 in positions appropriate for the proper alignment.

Figure 3:
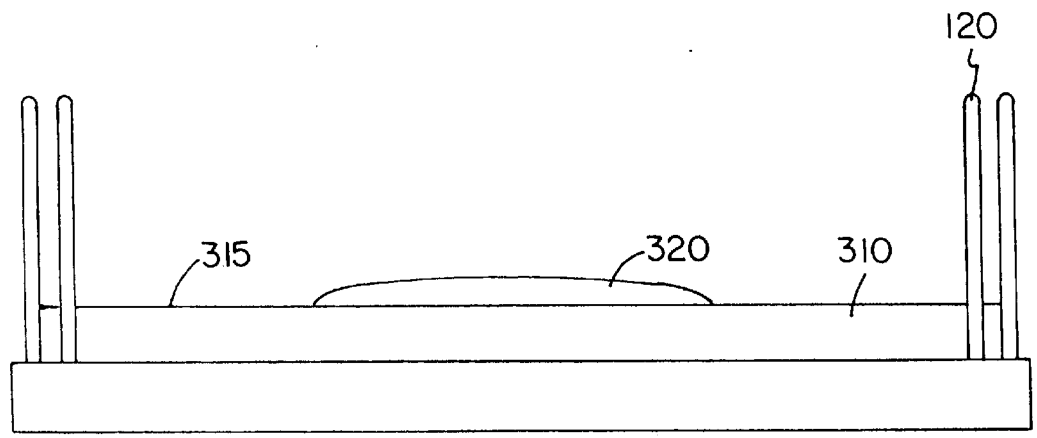
FIGS. 3 through 5 are side views of the alignment and assembly apparatus of FIGS. 1 and 2 which illustrate the various steps of creating an LCD stack-up in accordance with preferred embodiments of the present invention.
Figure 4:
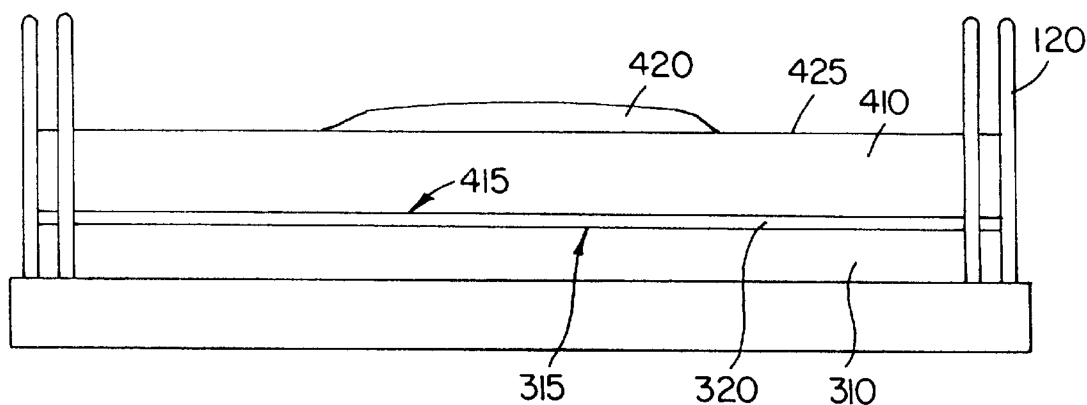
Figure 5:
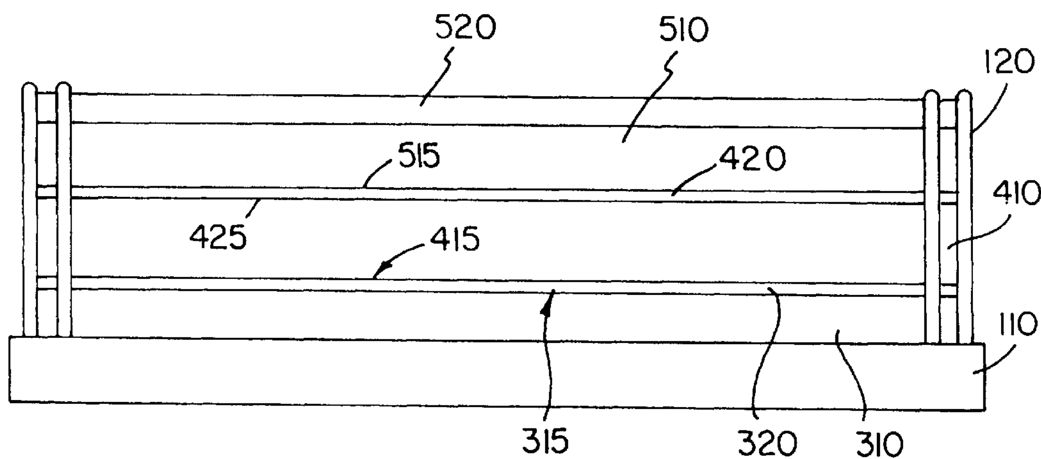

FIGS. 3 through 5 are side views illustrating fixture 100 used in the various steps of creating an LCD stack-up in accordance with the preferred methods and embodiments of the present invention. The process of creating an LCD stack-up is as follows. As shown in FIG. 3, first or rear optical component assembly 310 is placed into the pin field of fixture 100 such that the four corners of assembly 310 are held securely in place by pins 120. Substantially planar glass surface 315 of assembly 310 is oriented in an upward direction away from plate 110 of fixture 100.

Next, first quantity or layer 320 of silicone gel is placed on top of glass surface 315. In some preferred embodiments, the silicone gel used is an off the shelf product purchased from General Electric under the product number GE-5844. As purchased, the gel comes in two parts, part"A" and part "B". Part A contains diphenyl-dimethyl-siloxane. Part B contains vinyl terminated diphenyl-dimethyl polymer. Part B also includes a hydrosilane functional crosslinking agent of unknown structure, but believed to be a low molecular weight siloxane. For the uses of the gel anticipated by its manufacturer, the GE-5844 gel is intended to be mixed in a 1:1 ratio of parts A and B. However, it has been discovered that, when mixed in a 5:1 ratio of part A to part B, the silicone gel is an excellent adhesive material for use in attaching the glass of an optical component assembly to the glass of an LCD.

Next, as illustrated in FIG. 4, LCD 410 with flex tapes or cables (not shown) attached is placed into the pin field of fixture 100 on top of assembly 310 and silicone gel 320 such that four corners of LCD 410 are held securely in place by pins 120. By holding assembly 310 and LCD 410 securely in place, pins 120 of fixture 100 ensure proper alignment between assembly 310 and LCD 410. Typically, LCD 410 is placed into fixture 100 with surface 415 of its substantially planar glass substrate facing surface 315 of assembly 310 so that silicone gel 320 forms a substantially uniform layer in between these two surfaces. The silicone gel works best as an adhesive when the two surfaces it joins are both made from glass. Silicone gel 320 is of sufficient quantity that the layer formed between surfaces 315 and 415 is approximately 10 mils (0.010 inches) thick. After placement of LCD 410 into fixture 100, surface 425 of the LCD's filter is oriented in an upward direction away from plate 110. Second quantity or layer 420 of silicone gel is placed on top of glass surface 425. Silicone gel 420 is preferably mixed in the same ratio as silicone gel 320.

Next, as illustrated in FIG. 5, second or front optical component assembly 510 is placed in fixture 100 on top of LCD 410 and silicone gel 420 such that four corners of assembly 510 are held securely in place by pins 120. Thus, proper alignment between assembly 510 and LCD 410 and assembly 310 is ensured. Silicone gel 420 forms a substantially uniform layer between substantially planar glass surface 515 of assembly 510 and substantially planar glass surface 425 of LCD 410. As before, silicone gel 420 is preferably of sufficient quantity that the layer formed between surfaces 425 and 515 is approximately 10 mils thick.

Then, as is also illustrated in FIG. 5, uniform pressure plate or weight 520 is placed on top of assembly 510 in order to apply uniform pressure to the entire LCD stack-up. In preferred embodiments, the weight of plate 520 is chosen so as to apply a uniform pressure of 0.2 PSI across the entire LCD stack-up. The bed of pins containing the LCD stack-up is then placed into an oven and heated for a minimum of 48 hours at 80° C. in order to optimize the bondline (i.e., the thickness of layers of gel 320 and 420) and the strength of the gel adhesive.

The thickness of the bondline is dependent to a certain extent upon the pressure applied by weight 520. The pressures applied by weight 520 can be chosen to achieve a desired bondline and to help in obtaining a desired adhesive strength in a range of strengths possible with the silicone gel of the present invention. Through experimentation and analysis, it has been determined that little additional strength can be gained by applying pressures in excess of 0.2 PSI. Also, too thin of a bondline can reduce the strength of the gel as an adhesive.

The strength of the silicone gel as an adhesive is also dependent to a certain extent upon the time and temperature at which the gel is cured. The preferred time and temperature combination of 48 hours and 80° C. was determined through experimentation to be an optimizing combination. However, it is clear that other time, temperature and pressure combinations can be used to optimize the strength of the silicone gel as an optical component adhesive.

Figure 6:
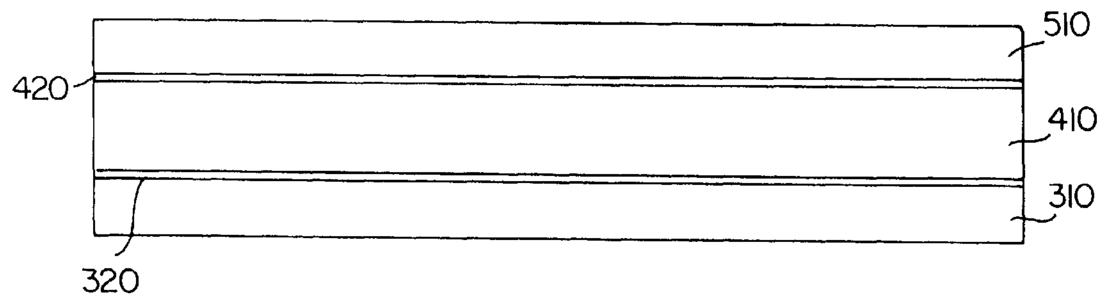
FIG. 6 is a side view of an LCD stack-up created according to preferred embodiments of the present invention.

FIG. 6 illustrates LCD stack-up or LCD assembly 600 which is the product of the above described process. LCD stack-up 600 includes optical component assemblies 310 and 510 removably attached to glass surfaces of LCD 410 by layers 320 and 420 of silicone gel. The silicone gel works best as an adhesive when it is applied between glass surfaces. Use of the silicone gel provides numerous advantages over previously used adhesives such as epoxy. Silicone gel in general, and particularly the preferred silicone gel described above, has optical characteristics that are more preferable than those of conventionally used adhesive materials. Also, the low durometer (soft) characteristics of the silicone gel used reduces strain on the display. Further, the"soft" characteristics of the silicone gel allows the optical component assemblies to be removed from the LCD so that repairs can be made. This is very advantageous because, when other adhesive materials have been used, LCD repair is difficult or impossible and scrap costs are accordingly increased.

While particular embodiments of the present invention have been shown and described, it should be clear that changes and modifications may be made to such embodiments without departing from the true scope and spirit of the invention. For instance, although a specific silicone gel and mixture ratio has been disclosed as a preferred embodiment, the present invention is not limited to this type or mixture of silicone gel. Rather, the present invention extends to the use of gel as an LCD adhesive in general. Also, it is clear that an LCD stack-up having an optical component assembly attached to only one side can be made using the preferred gel adhesive and methods. In these instances, the LCD can be placed into the alignment fixture first, and the single optical component assembly can be subsequently placed on top of the LCD and a layer of silicone gel. It is intended that the appended claims cover all such changes and modifications.

We claim:

1. A liquid crystal display stack-up comprising:

a liquid crystal display having a first surface;

a first optical component having a first surface;

a first layer of silicone gel positioned between the first surface of the liquid crystal display and the first surface of the first optical component, the first layer of silicone gel attaching the first optical component to the liquid crystal display; and, the first layer of silicone gel is formed from a silicone gel which includes a mixture of diphenyl-dimethyl-siloxane and vinyl terminated diphenyl-dimethyl polymer.

2. The liquid crystal display of claim 1 wherein the silicone gel also includes a hydrosilane functional crosslinking agent.

3. A method of assembling a liquid crystal display stack-up which includes a liquid crystal display and a first optical component, the method comprising:

placing one of the liquid crystal display and the first optical component into a fixture such that a first substantially planar surface of the one of the liquid crystal display and the first optical component is oriented upward;

applying a first quantity of silicone gel to the first substantially planar surface;

placing the other of the liquid crystal display and the first optical component into the fixture such that a second substantially planar surface of the other of the liquid crystal display and the first optical component is positioned adjacent to and facing the first substantially planar surface, the first quantity of silicone gel forming a first layer of silicone gel sandwiched between the first and second substantially planar surfaces, the first layer of silicone gel attaching the first optical component to the liquid crystal display to create the liquid crystal display stack-up;

applying heat to the liquid crystal display stack-up for a first period of time in order to help the first layer of silicone gel attach the first optical component to the liquid crystal display; and applying heat to the liquid crystal display stack-up for a first period of time includes applying at least approximately 80° C. heat to the liquid crystal display stack-up for at least approximately 48 hours in order to help the first layer of silicone gel attach the first optical component to the liquid crystal display.

4. A method of assembling a liquid crystal display stack-up which includes a liquid crystal displace and a first optical component, the method comprising:

placing one of the liquid crystal display and the first optical component into a fixture such that a first substantially planar surface of the one of the liquid crystal display and the first optical component is oriented upward;

applying a first quantity of silicone gel to the first substantially planar surface;

placing the other of the liquid crystal display and the first optical component into the fixture such that a second substantially planar surface of the other of the liquid crystal display and the first optical component is positioned adjacent to and facing the first substantially planar surface, the first quantity of silicone gel forming a first layer of silicone gel sandwiched between the first and second substantially planar surfaces, the first layer of silicone gel attaching the first optical component to the liquid crystal display to create the liquid crystal display stack-up; and applying a first quantity of silicone gel to the first substantially planar surface includes applying to the first substantially planar surface a first quantity of silicone gel having a mixture of diphenyl-dimethyl-siloxane and vinyl terminated diphenyl-dimethyl polymer.

* * * * *